F. WHEELER.
VEHICLE SPRING.
APPLICATION FILED JULY 5, 1910.
1,013,577.
Patented Jan. 2, 1912.
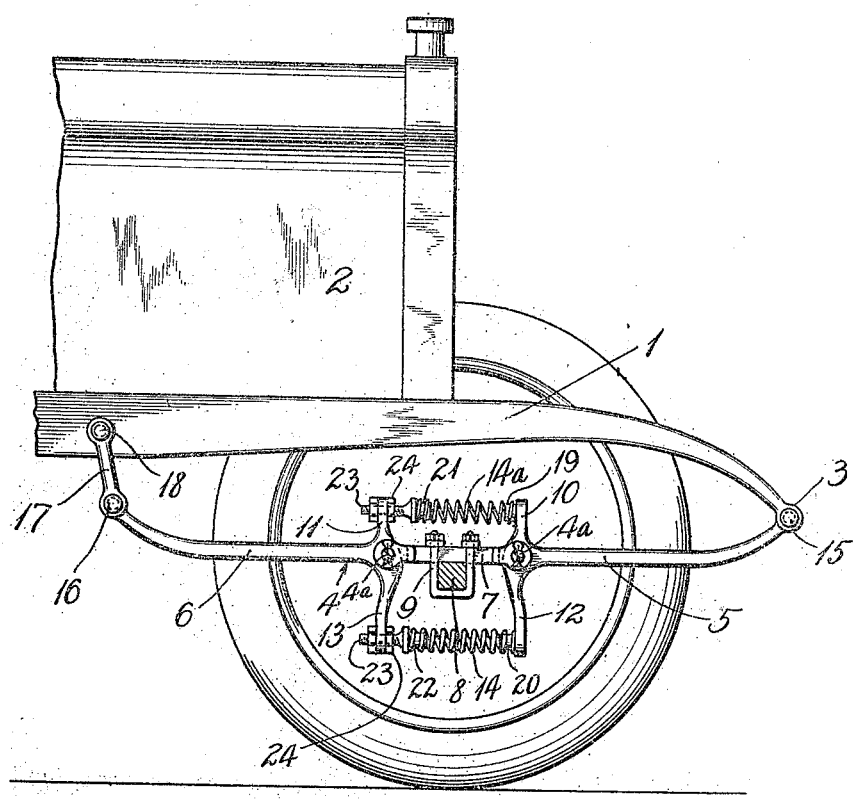
Witnesses.
E. R. Pollard
F. D. Ammen
Inventor:
Frank Wheeler
by Hazard & Strause,
Attys.

UNITED STATES PATENT OFFICE.

FRANK WHEELER, OF ORANGE, CALIFORNIA.

VEHICLE-SPRING.

1,013,577.  Specification of Letters Patent.  Patented Jan. 2, 1912.

Application filed July 5, 1910. Serial No. 570,493.

*To all whom it may concern:*

Be it known that I, FRANK WHEELER, a citizen of the United States, residing at Orange, county of Orange, State of California, have invented certain new and useful Improvements in Vehicle-Springs, of which the following is a specification.

This invention relates to vehicle springs and the invention is particularly applicable for supporting the frames of automobiles and similar vehicles on their axles.

The object of the invention is to produce a spring having an improved frame which will obviate the use of flat springs or leaf springs and which will give a high degree of resiliency.

A further object of the invention is to construct a spring so that the downward movement of the vehicle body will be resisted with greater resilient force than the upward movement.

The drawing shows the forward portion of the automobile frame in side elevation, a portion of the hood being also represented and showing one of my springs applied to the frame, the axles of the vehicle being shown in cross section. This view is diagrammatic in character and the spokes and hub of the wheel have been omitted.

Referring more particularly to the parts 1 represents one of the side bars of the vehicle frame at the forward end of the frame and adjacent to the hood 2. The forward end of this side bar 1 is bent downwardly so as to form a pivot head 3.

In applying my invention I provide a spring frame 4 which comprises a pair of longitudinally extending bars 5 and 6, the bodies of which form the long arms of double bell crank levers, the adjacent ends of the side bars 5 and 6 being pivotally attached to an anchor plate 7 which is secured to the axle 8 by means of suitable clips 9 as shown. The bars 5 and 6 have short arms 10 and 11 which extend upwardly and between these arms 10 and 11 a compression spring 14$^a$ of relatively light character is mounted as shown. The bars 5 have downwardly extending intermediate arms 12 and 13 and between these arms 12 and 13 a compression spring 14 is mounted which is of relatively greater force than the spring 14$^a$. The forward end of the bar 5 thrusts upwardly and is pivotally attached to the pivot head 3 by pivot pin 15. The rear end of the bar 6 turns upwardly and is pivotally attached by a pivot pin 16 to a link 17 which link is suspended on a pivot stud 18 projecting from the side of the frame bar 1 as shown. The pivot pins 4$^a$ which connect the bars 5 and 6 to the anchor plates 7 are located at the juncture of the arms 10 and 12, and arms 11 and 13, as shown.

The springs 14 and 14$^a$ are simply helical coiled springs. At the arms 10 and 12 they are supported on studs 19 and 20 which project into their open ends from the arms as indicated. At the left end they are supported on studs 21 and 22 which are similarly arranged with respect to them and these studs 21 and 22 are provided with screw threaded stems 23 which pass through the arms 11 and 13 and may be secured rigidly in adjusted positions by means of check nuts 24 arranged as shown. By means of these adjusted stems the state of compression of the springs 14 and 14$^a$ may be very nicely adjusted.

When the vehicle strikes an uneven point in the roadway and the body and frame tend to descend, the descent is resisted by the spring 14 and the resisting force increases of course as the frame approaches the limit of its downward movement. As the spring 14 returns to its normal position it may first lengthen abnormally and the spring 14$^a$ may then be slightly compressed and resist the upward movement of the frame and body of the vehicle. It should be understood that the ends of the spring 14 and 14$^a$ are not attached to the studs which support their ends and from this arrangement neither of these springs can be placed in tension, and furthermore, when one of the springs is in action the other is in a state of rest. In this way all of the downward movement of the body and frame is resisted by heavy springs and the upward movement by light springs and these light springs oppose the action of the heavy springs in restoring the body to a normal position.

What I claim is:—

A vehicle spring structure comprising an axle engaging member, bell-crank levers pivoted to the opposite ends of said axle member, and each formed with long and short arms, their shorter arms extending below the axle, a load supporting compression spring set between the ends of the depending shorter arms, the said bell-crank levers also having abutment arms extending above the axle, a compression rebound spring set between said abutment arms, one bell-crank lever having integral spring seats upon its depending short arm and its abutment arm, while the other bell-crank lever carries adjustable spring seats upon its arms adapted to be tightened against said springs sufficiently to prevent their displacement.

In witness that I claim the foregoing I have hereunto subscribed my name this 27th day of June, 1910.

FRANK WHEELER.

Witnesses:
 F. D. AMMEN,
 EDMUND A. STRAUSE.